United States Patent [19]

Chiang et al.

[11] Patent Number: 4,476,239

[45] Date of Patent: Oct. 9, 1984

[54] PRODUCTION OF FLUID CATALYTIC CRACKING CATALYSTS

[75] Inventors: Robert L. Chiang; Julius Scherzer, both of Anaheim, Calif.

[73] Assignee: Harshaw/Filtrol Partnership, Oakland, Calif.

[21] Appl. No.: 491,466

[22] Filed: May 4, 1983

[51] Int. Cl.$^3$ .............................................. B01J 29/08
[52] U.S. Cl. ...................................................... 502/68
[58] Field of Search ........................................... 502/68

[56] References Cited

U.S. PATENT DOCUMENTS 3,629,152 12/1971 Lindsley et al. .................. 502/68 X
4,079,019 3/1978 Scherzer et al. .................. 502/68 X
4,253,989 3/1981 Lim et al. .............................. 502/68

OTHER PUBLICATIONS

Catalysis–Fundamental Principles, Edited by Emmett, Reinhold Publishing Corp., N.Y., 1954, (vol. I), pp. 327, 328.

Primary Examiner—Carl F. Dees
Attorney, Agent, or Firm—Andrew E. Barlay

[57] ABSTRACT

Preparation of fluid catalytic cracking catalysts is improved by incorporating a viscosity-reducing agent, having the general formula of $Al_2(OH)_5NO_3$, in the aqueous slurry containing the catalyst components of zeolite, clay, aluminous binder, and a silica source, prior to drying of the slurry. The viscosity-reducing additive allows an increase in the solids content of the aqueous slurry and thus improves the efficiency of the drying operation.

7 Claims, 2 Drawing Figures

PRODUCTION OF FLUID CATALYTIC CRACKING CATALYSTS

BACKGROUND OF THE INVENTION

This invention relates to the production of fluid catalytic cracking catalysts. These fluid catalytic cracking catalysts (hereinafter "FCC catalysts") are generally prepared from a mixture of zeolite particles, clay, an alumina-containing binder, and a silica source. These constituents are admixed in an aqueous slurry in certain proportions, then the aqueous slurry is subjected to drying to form the essentially water-free FCC catalyst particles.

The productivity of the process is generally limited by the solids content of the aqueous slurry subjected to the drying step. The higher the solids content of the slurry, the better the throughput rate in a given piece of equipment with simultaneous better utilization of the heat input in the dryer. When the drying operation is accomplished by using conventionally available drying equipment, such as spray-driers, the viscosity of the aqueous slurry plays a significant role. Spray driers are usually equipped with nozzles or rotating discs and if the slurry has a high viscosity, which is related to the solids content of the slurry, plugging of the nozzles or stoppage of the discs will occur interrupting the production of the FCC catalysts. Consequently, a balance must be found between the desired production rate and the solids content of the aqueous slurry.

In our copending application Ser. No. 420,439, filed Sept. 20, 1982 now U.S. Pat. No. 4,443,553, a process for reducing the viscosity of aqueous slurries containing the FCC catalyst forming constituents, is described. The reduction in viscosity and corresponding improvement in the production rate is achieved by the incorporation of an additive having the general formula of $(Al_2(OH)_{6-y}Cl_y)_x$ where $x=1$ to 6 and $y=1$ to 2. This additive is incorporated in the aqueous slurry in an amount equivalent to from about 0.5 to about 2.5% by weight calculated as $Al_2O_3$ and based on the solids content of the slurry. The addition of this additive to the slurry allows a significant increase in the solids content of the slurry, for example, up to about 20% by weight.

Although the addition of the $(Al_2(OH)_{6-y}Cl_y)_x$ additive provides significantly improved production efficiency and energy savings, the FCC catalyst particles produced will contain a small quantity of chloride residue. Although in most catalytic cracking applications, the residual chloride content (0.1-0.3% by wt.) of the FCC catalyst does not create problems, there are a few processes where the presence of the chloride could interfere with the efficiency of the catalytic cracking. Consequently, there has arisen a need to find an additive which on the one hand reduces the viscosity of the aqueous slurry and on the other hand does not leave behind an anionic impurity which could interfere with any FCC operation. It has been surprisingly discovered that there is an alumina-containing additive, having the general formula of $Al_2(OH)_5NO_3$, which accomplished the desired viscosity reduction, but when incorporated in the aqueous slurry used for the FCC catalyst preparation, will not provide any residual effect in terms of catalyst performance and/or activity.

BRIEF SUMMARY OF THE INVENTION

In the process of producing fluid catalytic cracking catalysts by preparing an aqueous slurry from the components forming the catalyst, such as zeolite, clay, alumina-containing binder, and a silica source, and then subjecting the slurry to drying to form the catalyst particles, the efficiency of the drying step can be significantly improved by incorporating in the aqueous slurry a viscosity-reducing additive. The viscosity-reducing additive has the general formula of $Al_2(OH)_5NO_3$ and is incorporated in the slurry in an amount sufficient to reduce the viscosity of the slurry, generally in a quantity equivalent to about 0.2% to about 2.5% by weight, calculated as $Al_2O_3$ and based on the total solids content of the aqueous slurry. The viscosity-reducing additive, when incorporated in the slurry in the amounts indicated, can significantly reduce the slurry viscosity. This allows an increase in the solids content of the slurry to be dried with corresponding increase in production rate and drier efficiency.

DETAILED DESCRIPTION OF THE INVENTION

Figure 1:
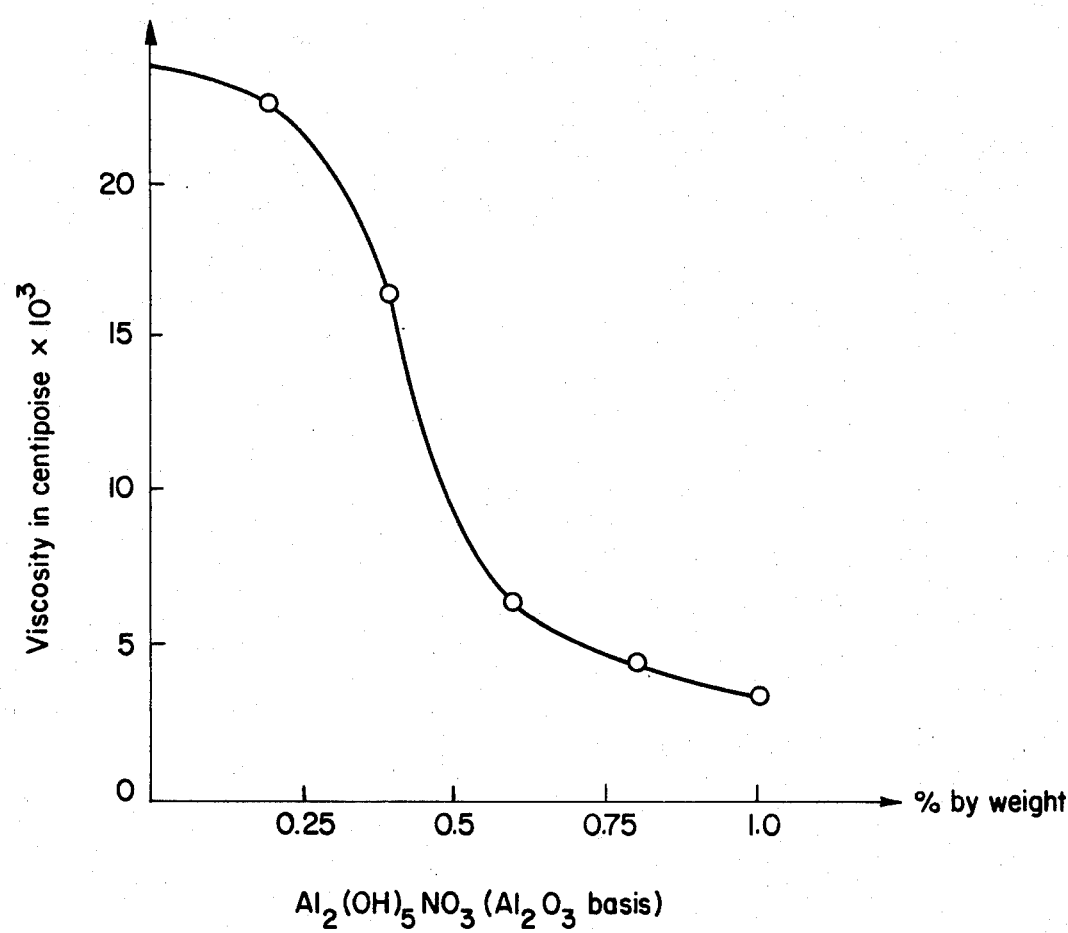
FIG. 1 shows the viscosity-reducing effect of the $Al_2(OH)_5NO_3$ additive when incorporated at various concentrations into aqueous slurries, which contain fluid catalytic cracking catalyst components to be formed into catalyst by drying.

This invention relates to an improved process for producing FCC catalysts. More particularly, the present invention concerns an improvement in the preparation of FCC catalysts wherein an aqueous slurry of catalyst components is dried to form the catalyst particles. The improvement in the production of FCC catalysts is accomplished by incorporating in the aqueous slurry a viscosity-reducing additive which will allow an increase in the solids content of the slurry resulting in increased productivity and improved energy balance.

Preparation of FCC catalysts is a well-known manufacturing operation and is generally accomplished by preparing an aqueous slurry of the catalyst forming constituents. The catalyst-forming constituents usually employed in the production of FCC catalysts are zeolite particles, clay, an alumina-containing binder, and a silica source.

The zeolite component utilized in the preparation of the FCC catalyst, according to the present process, is generally selected from faujasite zeolites of the Y-type. In the preparation of Y-type zeolites from alumina and sodium silicate, the formed product often contains a relatively high percentage of alkali metal ions. This is considered detrimental for many applications and consequently, the zeolite is subjected to ion exchange to replace to a large extent the alkali metal ions with more desirable ions, such as ammonium, hydrogen, alkaline earth, and rare earth metal cations. For the instant process, such zeolites are preferred which contain rare earth metal ions as replacement for the alkali metal ions. The quantity of zeolites incorporated in the FCC catalyst is generally in the range from about 10 to about 35% by weight; consequently, the aqueous slurry used for making the FCC catalyst also contains this quantity of zeolite dispersed in the aqueous medium.

The alumina-containing binder used for the preparation of the FCC catalyst can be selected from aluminas having either an alpha alumina monohydrate or a pseudoboehmitic structure. The alpha alumina monohydrate is generally derived from the water hydrolysis of aluminum alkoxides, is commercially available as "CATAPAL", and is characterized by a surface area in excess of about 200 m$^2$/g, an Al$_2$O$_3$ content of at least about 70% by weight. The pseudoboehmite alumina is also available commercially as "Kaiser SA" and is characterized by an x-ray diffraction pattern wherein a broad peak appears in the range of 10-18 Angstroms peaking at 13.5 Angstroms when Cu K$\alpha$ radiation is employed. It is further characterized by an Al$_2$O$_3$ content of at least 70% by weight and a surface area in excess of about 200 m$^2$/g. The quantity of binder incorporated in the aqueous slurry is usually in the range from about 7 to about 21% by weight, calculated as Al$_2$O$_3$ and based on the total solids content of the aqueous slurry. For optimum results, the alumina-containing binder is peptized with an acid, such as formic acid, prior to its incorporation in the aqueous slurry. Peptization can be readily accomplished in accordance with the teachings of U.S. Pat. No. 4,086,187, the teachings of which are incorporated herein by reference.

The clay component used for making the FCC catalyst can be selected from conventionally employed clays, such as kaolinite and crystalline kaolin. Suitable kaolins include ball clay and halloysite. The clay component is incorporated in the aqueous slurry in amounts in the range of about 60 to 70% by weight based on the total solids content of the aqueous slurry, the clay quantity being calculated on the dry weight of the clay when dried at about 930° C. (1700° F.) for about 1 hour.

Suitable silica source for the FCC catalyst is a polysilicate, such as described in detail in the aforementioned U.S. Pat. No. 4,086,187. The quantity of silica added to the slurry is generally kept within the range from about 1 to about 7% by weight based on the total solids content of the slurry.

The aforementioned components are incorporated in the aqueous slurry and the slurry is then agitated to assure uniform mixing and dispersion of the constituents. Subsequent to the incorporation of these ingredients in the slurry, the viscosity-reducing additive is added to the slurry under agitation. The quantity of Al$_2$(OH)$_5$NO$_3$ additive added to the slurry is kept within the range from about 0.2 to about 2.5% by weight (calculated as Al$_2$O$_3$) based on the total solids content of the aqueous slurry. Best viscosity-reducing results are achieved when the additive is employed in the range from about 0.5 to about 2.0% by weight. The quantity to be incorporated in the aqueous slurry within the ranges indicated depends on the final solids content of the slurry and viscosity desired. Thus, the higher the desired final solids content of the slurry, the higher the quantity of additive incorporated. Addition of the viscosity-reducing additive to the slurry causes reduction in the slurry viscosity within a short time period, usually within minutes. This reduction in viscosity allows the addition of additional FCC catalyst components to the slurry in the same ratio as added to the original slurry. It has been found that in the absence of the viscosity-reducing additive, the maximum solids content of the slurry is limited to about 20-25% by weight. Addition of the Al$_2$(OH)$_5$NO$_3$ agent allows the slurry solids content to be increased to about 30% by weight without increasing the viscosity of the slurry of increased solids content beyond the viscosity obtained without the additive. This significant increase achieved in solids content without deleterious viscosity effects represents a significant advance in the art of manufacturing FCC catalyst from both a productivity and an energy utilization point of view.

The following examples will further present the novel aspects of the present process.

EXAMPLE I

Five aqueous slurries were prepared for the manufacture of FCC catalyst. Each slurry had a total solids content of 25% by weight and each contained a blend of Y-type, rare earth metal exchanged zeolite 18%, alpha alumina monohydrate binder 18%, kaolin-type clay 61.5% and ammonium polysilicate 2.5% (all percentages are weight percents based on the total solids content). Each of the slurries was prepared by first peptizing the alumina binder with aqueous formic acid under agitation followed by addition of the clay component to the slurry of peptized alumina binder. The slurry was vigorously agitated for about 10 minutes followed by addition of the zeolite component under agitation. Finally, the ammonium polysilicate was incorporated in the slurry. Subsequently, varying quantities (0.2%, 0.4%, 0.6%, 0.8%, and 1.0% by weight) of Al$_2$(OH)$_5$NO$_3$, calculated as Al$_2$O$_3$ and based on the total solids content of the slurry, were added to the individual slurries to establish the viscosity-reducing effect of the additive. The viscosity measurements were tabulated and are provided in Table I and are also graphically shown in FIG. 1.

TABLE I

Effect of Al$_2$(OH)$_5$NO$_3$ Additive Quantity on FCC Slurry Viscosity

| Al$_2$(OH)$_5$NO$_3$ % (Al$_2$O$_3$ basis) | 0.20 | 0.4 | 0.6 | 0.8 | 1.0 |
|---|---|---|---|---|---|
| Viscosity in cps prior to addn. of Al$_2$(OH)$_5$NO$_3$ | 23050 | 22500 | 22350 | 26400 | 24200 |
| Viscosity in cps after addn. of Al$_2$(OH)$_5$NO$_3$ | 21750 | 17600 | 8400 | 6650 | 5500 |

From Table I, it can be readily observed that significant viscosity reductions can be achieved by incorporation of the Al$_2$(OH)$_5$NO$_3$ additive.

Example II

Figure 2:
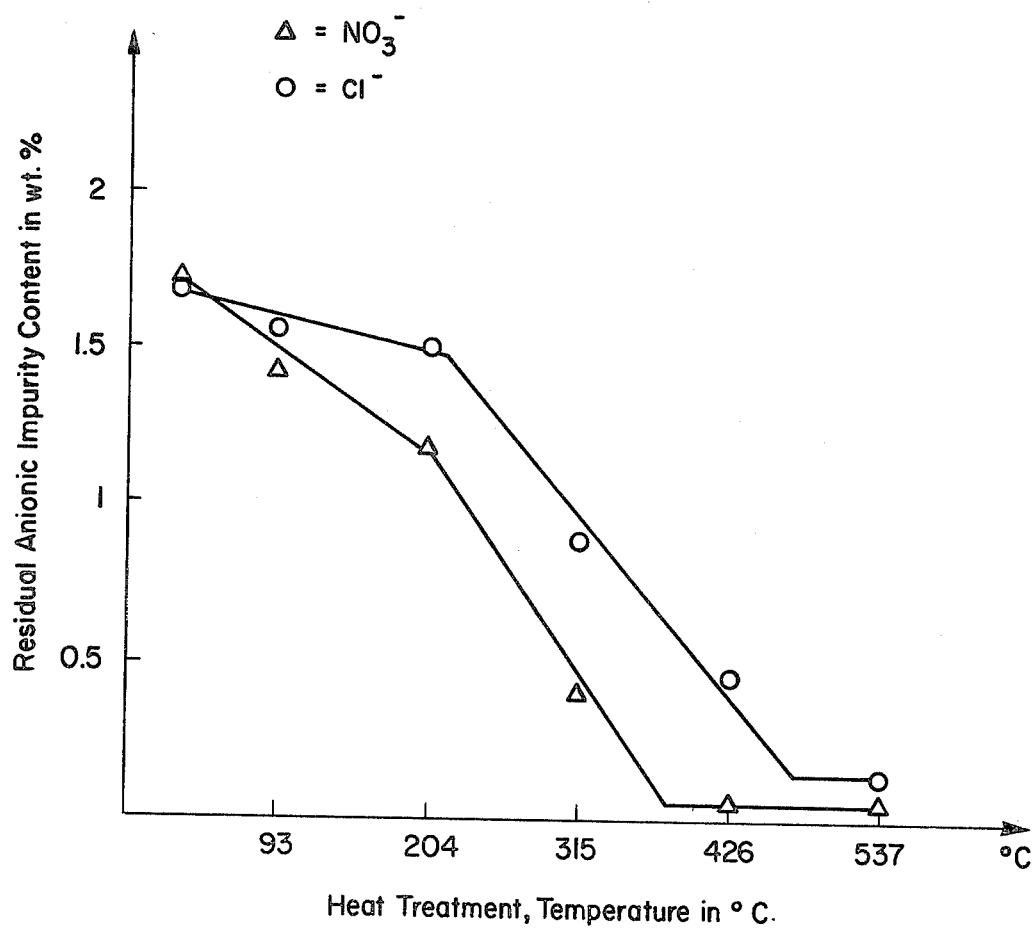
FIG. 2 shows a comparison of the residual anion levels for $Al_2(OH)_5NO_3$ and $(Al_2(OH)_{6-y}Cl_y)_x$ viscosity-reducing additives as a function of heat treatment.

In this Example, the residual anion content of FCC catalysts made with the instant Al$_2$(OH)$_5$NO$_3$ additive and with (Al$_2$(OH)$_{6-y}$Cl$_y$)$_x$ additive were compared as a function of heat treatment temperature in a muffle furnace between the temperature range from about 93° C. (200° F.) and about 538° C. (1000° F.). The residual anion content (NO$^-_3$ or Cl$^-$) was measured after the catalyst was subjected to heat treatment at five different temperatures within the range given. The results are tabulated in Table II and are also shown graphically in FIG. 2.

TABLE II

Residual Anion Content of FCC Catalyst Made with Al$_2$(OH)$_5$NO$_3$ and (Al$_2$(OH)$_{6-y}$Cl$_y$)$_x$ Additives After Heat Treatment at Various Temperatures

| Heat Treatment Temp. in °C. for 1 hour | 93° C. | 204° C. | 315° C. | 426° C. | 537° C. |
|---|---|---|---|---|---|
| Residual NO$^-_3$ Content in % of FCC Catalyst | 1.4 | 1.1 | 0.4 | 0.01 | <0.01 |

TABLE II-continued

Residual Anion Content of FCC Catalyst Made with $Al_2(OH)_5NO_3$ and $(Al_2(OH)_{6-y}Cl_y)_x$ Additives After Heat Treatment at Various Temperatures

| Heat Treatment Temp. in °C. for 1 hour | 93° C. | 204° C. | 315° C. | 426° C. | 537° C. |
| --- | --- | --- | --- | --- | --- |
| Residual Cl⁻ Content in % of FCC Catalyst | 1.6 | 1.5 | 0.8 | 0.4 | 0.1 |

It was further observed that during spray-drying of the aqueous slurry containing the $Al_2(OH)_5NO_3$ viscosity-reducing additive, no environmentally harmful $NO_x$ emissions occurred, which further enhances the significance of the instant process.

Also, the incorporation of the additive in the FCC catalyst does not interfere with the catalyst activity or its physical properties, such as strength.

We claim:

1. In the process of producing fluid catalytic cracking catalysts from a mixture of zeolite particles, clay, alumina-containing binder, and a silica source, said mixture being dispersed in an aqueous slurry and by drying the aqueous slurry, the improvement which comprises incorporating in the slurry a viscosity-reducing additive having the formula of $Al_2(OH)_5NO_3$ in an amount equivalent to from about 0.2 to about 2.5% by weight of the total solids content of the slurry, the percentage being based on the $Al_2O_3$ content of the additive, thus reducing the viscosity of the aqueous slurry from its additive-free level to a lower level, adding an additional quantity of fluid catalytic cracking catalyst forming constituents in the same weight ratio as used for making the additive-free slurry in an amount up to that required for reestablishing the viscosity of the slurry to its additive-free level and drying the aqueous slurry of increased solids content to form fluid catalytic cracking catalyst particles.

2. Process according to claim 1, wherein the quantity of $Al_2(OH)_5NO_3$ added to the aqueous slurry is in the range of from about 0.5 to about 2.0% by weight calculated as $Al_2O_3$ and based on the total solids content of the additive-free slurry.

3. Process according to claim 1, wherein the zeolite particles incorporated in the aqueous slurry are faujasite zeolites of the Y-type.

4. Process according to claim 1, wherein the silica-source is a polysilicate.

5. Process according to claim 1, wherein the alumina-containing binder is selected from alpha alumina monohydrate and pseudoboehmite.

6. Process according to claim 1, wherein the clay is selected from kaolinite and crystalline kaolin.

7. Process according to claim 3, wherein the Y-type zeolite is a rare earth metal exchanged zeolite.

* * * * *